United States Patent [19] [11] 4,394,578
Houston et al. [45] Jul. 19, 1983

[54] HIGH PRESSURE, HIGH RESOLUTION XENON X-RAY DETECTOR ARRAY

[75] Inventors: John M. Houston, Schenectady; Nathan R. Whetten, Burnt Hills, both of N.Y.

[73] Assignee: General Electric Company, Schenectady, N.Y.

[21] Appl. No.: 257,026

[22] Filed: Apr. 24, 1981

[51] Int. Cl.³ .................... G01T 1/18

[52] U.S. Cl. .................... 250/374; 250/385; 250/394

[58] Field of Search .................... 250/374, 385, 394; 313/93; 378/4

[56] References Cited

U.S. PATENT DOCUMENTS 4,031,396 6/1977 Whetten et al. .................... 250/385
4,047,041 9/1977 Houston .................... 250/385

*Primary Examiner*—Alfred E. Smith
*Assistant Examiner*—Janice A. Howell
*Attorney, Agent, or Firm*—Lawrence D. Cutter; James C. Davis, Jr.; Marvin Snyder

[57] ABSTRACT

A high pressure, high resolution xenon x-ray detector array employs a housing having a window therein for passage of x-rays from an x-ray source and sealed to form a detection chamber. A voltage plate and a collector plate are disposed in the detection chamber in parallel relationship and passed through the housing to outside contacts. Xenon is disposed within the chamber with a pressure range of 50 to 200 atmospheres producing a xenon density in the range of 0.5 to 2.5 grams per cubic centimeter.

9 Claims, 5 Drawing Figures

HIGH PRESSURE, HIGH RESOLUTION XENON X-RAY DETECTOR ARRAY

BACKGROUND OF THE INVENTION

This invention relates to detectors for computerized tomography, and more particularly, to a high pressure, high resolution xenon x-ray detector array.

At present, there is considerable interest in determining the utility of industrial computerized tomography for such applications as inspection of jet engine turbine buckets, nuclear fuel rods, cracks in welds in nuclear power plants, and other industrial inspection functions. Generally, these applications require higher resolution and higher energy x-rays than do medical applications.

A xenon x-ray detector array for medical computerized tomography is described in U.S. Pat. No. 4,031,396, issued June 21, 1977 to Whetten et al., and assigned to the instant assignee. The xenon pressure employed in this patent is stated to be 10 to 50 atmospheres. An x-ray detector array is described in U.S. Pat. No. 4,047,041, issued Sept. 6, 1977 to Houston and assigned to the instant assignee. This detector employs a detector gas pressure of between 10 and 100 atmospheres and two anode sheets parallel to each other and to the plane of the x-ray fan beam. A plane of rod-like cathode elements or strips of electrically-conductive material disposed on a sheet of dielectric material is placed parallel to the anode sheets and midway between them. Present medical x-ray detectors employ relatively large cell spacing and, consequently, yield relatively low spacial resolution. Further increasing the spacial resolution would require an increase in the x-ray dose to the patient which may be beyond the tolerable level for the patient.

SUMMARY OF THE INVENTION

It is an object of the instant invention to provide a xenon x-ray detector having a high xenon pressure and xenon density in combination with a collector structure for improving spacial resolution. It is a further object of the instant invention to provide a more convenient external electrical connection to the collector.

The instant invention provides a high resolution detector array for computerized tomography, which includes a sealed housing forming a chamber having a window therein penetrable by x-rays, with a plurality of collector strips extending through one wall of said housing and into said chamber and a voltage plate disposed in said chamber and connected to contacts outside said chambers and a volume of xenon gas within said chamber sufficient to produce a xenon density of approximately 1.5 grams per cubic centimeter. In a particularly preferred embodiment of the instant invention, said collector strips comprise a plurality of parallel conducting strips disposed in said chamber parallel to an axis of an incident beam of x-rays entering said window.

BRIEF DESCRIPTION OF THE DRAWINGS

Features of the invention believed to be novel and unobvious over the prior art are set forth with particularity in the appended claims. The invention itself, however, as to organization, method of operation and advantages thereof, may best be understood by reference to the following description taken in conjunction with the accompanying drawings in which like reference characters refer to like elements throughout, and in which:

DESCRIPTION OF PREFERRED EMBODIMENTS

Figure 1:
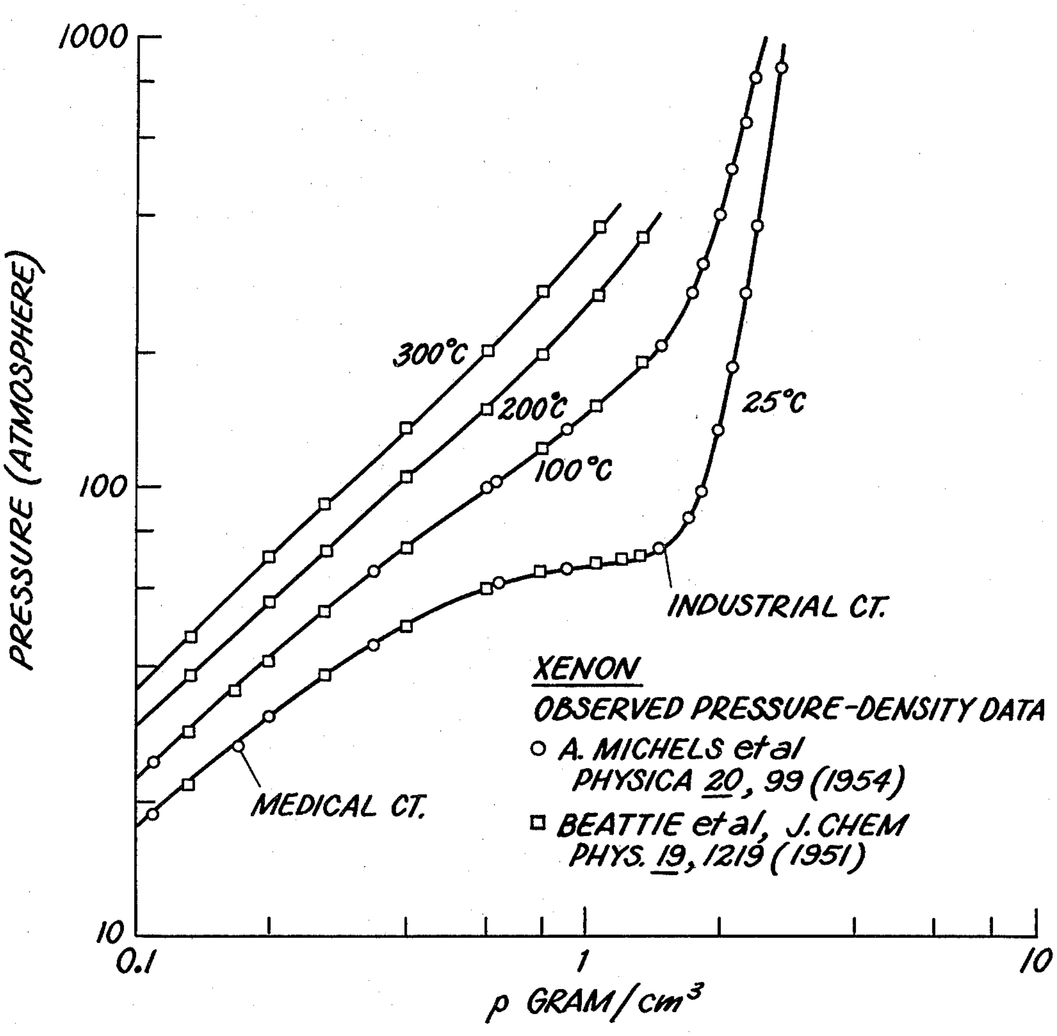
FIG. 1 is a graphical illustration of pressure vs. density relationship for xenon.

Xenon has been shown to have a pressure density relationship at room temperature at pressures above 30 atmospheres which departs significantly from the ideal gas law. As shown in FIG. 1, by increasing xenon pressure by a factor of 3 from 25 to 75 atmospheres, an increase in xenon density by a factor 9.1 is achieved. As shown in FIG. 1, detector gas pressure for medical computerized tomography is in the range of 25 atmospheres. For detection of higher energy x-rays employed in industrial computerized tomography gas pressures of about 75 atmospheres and above are desirable. The lines in FIG. 1 show the pressure vs. density relationships for xenon as reported by Beattie et al. in *The Journal of Chemical Physics,* dated October, 1951, in an article on pages 1219–1221, titled "The Compressibility of Gaseous Xenon. I. An Equation of State for Xenon and the Weight of a Liter of Xenon", and by Michels et al. in volume XX of *Physica,* dated 1954, in an article on pages 99–106, titled "Isotherms of Xenon at Temperatures Between 0° C. and 150° C. and at Densities up to 515 Amagats (Pressures up to 2800 Atmospheres)". This rapid density increase makes xenon an ideal gas to use in industrial x-ray detection, since the pressure increases much less than the x-ray stopping power which is a function of gas density. For example, at 1.5 grams per cubic centimeter, 65% of the energy in a 200 Kev x-ray beam is absorbed in traversing 1" of xenon using the equation $(\mu/\rho)=0.279$ centimeter sq. per gram for the total absorption cross section of 200 kev x-rays, where $\mu$ is the x-ray absorption coefficient for the gas used, and $\rho$ is the gas density in grams/cubic centimeter.

Figure 2:
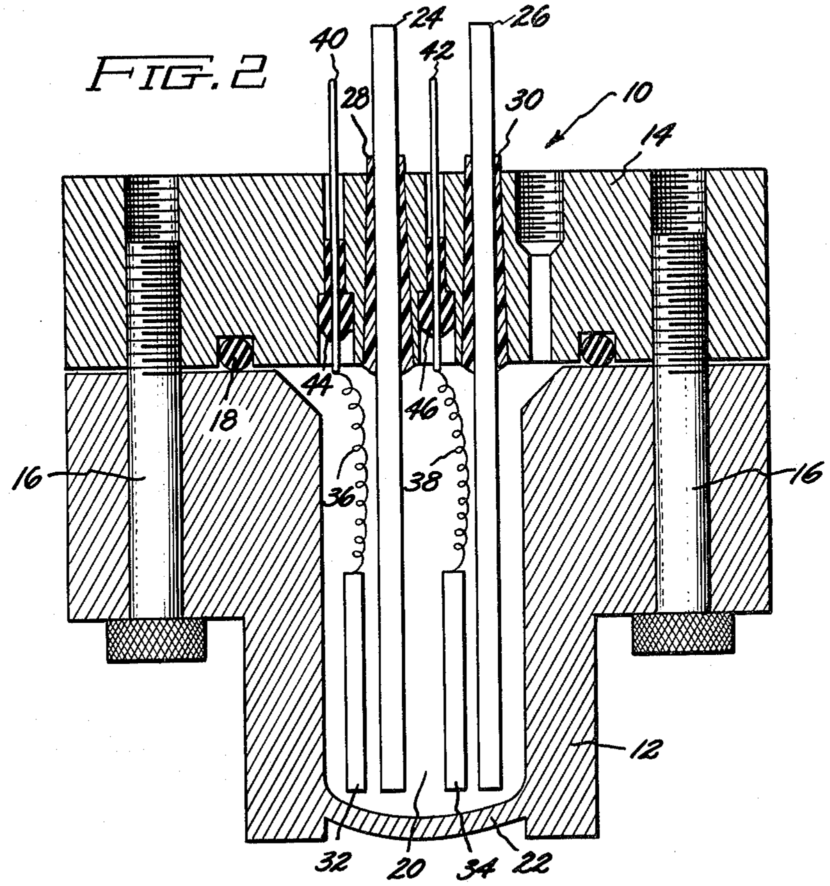
FIG. 2 is a schematic partial cross-sectional view of a detector according to the instant invention.

An x-ray detector built according to the instant invention is shown in FIG. 2. The detector 10 includes a generally-cylindrical housing 12 of a metal or metal alloy having an end plate 14 of metal or metal alloy attached thereto by, for example, bolts 16. The end plate 14 is sealed to the housing 12 by an o-ring seal 18 made of compressible material, such as rubber. The housing 12 includes a generally cylindrical chamber 20 closed at one end by a window 22 made of a thin sheet of material readily penetrated by x-rays, for example, aluminum. The opposite end of the chamber 20 is closed by the end plate 14. Extending through end plate 14 are collector plates 24, 26 which are sealed by tapered epoxy seals 28, 30, respectively. Also disposed in the chamber are voltage plates 32, 34 connected via electrical conductors 36, 38, respectively, to electrical contacts 40, 42, respectively, which extend through the end plate 14 and are sealed thereto with gaskets 44, 46, respectively. It is to be understood that a detector may employ a single collector plate and voltage plate, or any practical number thereof.

Figure 3:
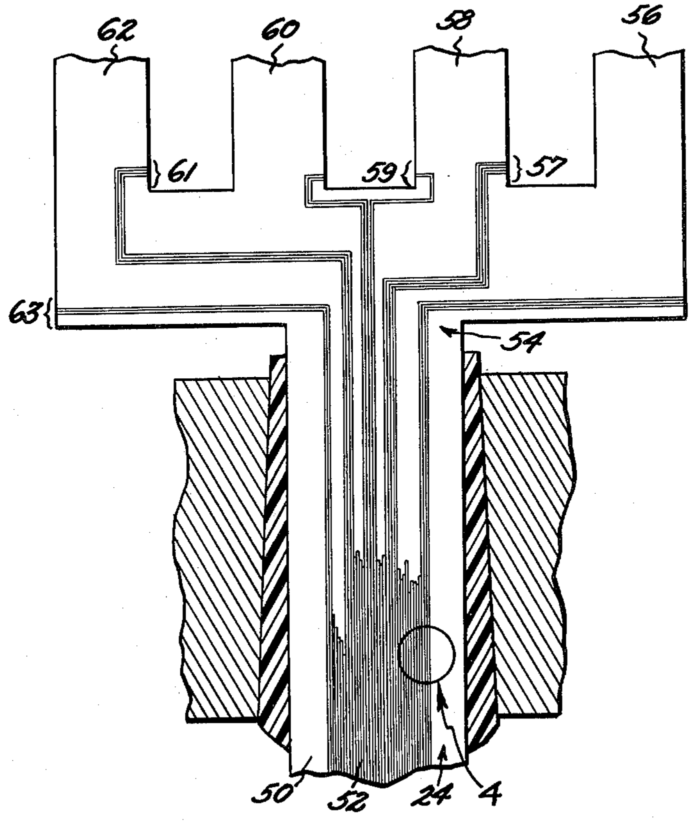
FIG. 3 is an enlarged, partial schematic view of a collecting strip according to the instant invention.

FIG. 3 is an enlarged illustration of a collector strip pattern on the collector plate as it passes through the end plate of the detector. The collector plate 24 comprises a ceramic substrate 50 of, for example, MACOR® Machinable Glass-Ceramic (MACOR is a registered trademark of Corning Glass Works), with photolithographic patterned gold strips 52 deposited thereon to serve as detector elements. The end 54 of the collector plate external to the detector is made into a plurality of rectangular peninsulas 56, 58, 60 and 62, each having connection areas for a plurality of the individual collector strips disposed thereon at the edges thereof. For example, peninsula 58 has connection areas 57, 59 on the respective edges. The number of peninsulas would be selected to satisfy the connection requirement for a particular detector. For example, in a detector having 500 detector elements, 5 to 10 rectangular peninsulas would be sufficient to allow each side of a peninsula to provide connection for 25 to 50 individual collector strips, thereby greatly facilitating connection of the strips to external circuitry. The strip-to-strip, center-to-center spacing can be much wider on the peninsulas than on the collector plate itself. This makes external electrical connection much cheaper and more reliable.

Figure 4:
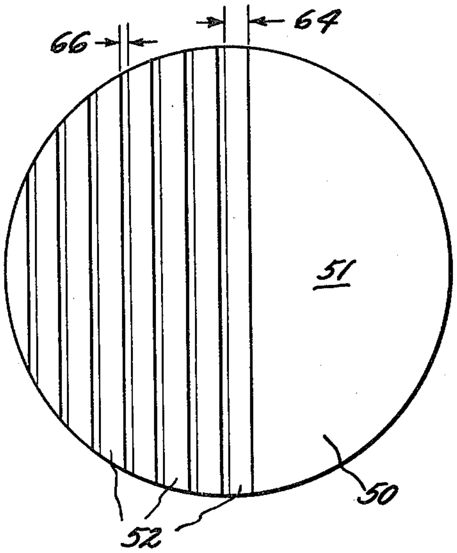
FIG. 4 is an enlarged pictorial view showing the collector strips of a collector for the instant invention as shown by the circle 4 of FIG. 3.

As shown in the enlargement view in FIG. 4, the collector strips 52 are arranged in parallel relationship on the surface of collector plate substrate 50. The collector strips are made by sputtering chromium and gold layers onto the substrate. An accurately drawn pattern of strips is photoreduced and used to expose a photoresist layer applied to the gold surface. The surface is then etched down to the substrate surface 51 according to the exposure pattern, so as to leave the desired metallic collecting strips 52. Typically, the collector strip width 64 is in the range of 4 mils and the spacing 66 between adjacent strips is in the range of 1 mil. The thickness of the collecting strips is in the range of 1 to 2 mils.

The detector of the present invention operates in the following manner. An x-ray fan beam enters the detector 10 through window 22 and passes between the flat electrodes parallel to the plane of the electrodes. The separation between the respective voltage on collector plates usually approximates the slice height of the x-ray fan beam, conventionally of about 0.01 to about 0.1 inch. The voltage plates are connected to a source of electrical potential located outside said detector providing a potential in the range of 200–20,000 volts of either positive or negative polarity to produce a voltage gradient in the range of from 10 to 1000 volts/millimeter. The collector strips are operated near ground potential. X-rays incident on the detector enter through the thin curved aluminum window 22 and are stopped by the xenon gas by photoelectric and Compton interactions, thereby ionizing the xenon atoms. The electrodes provide a collecting electric field perpendicular to the fan plane and to the x-ray beam direction. Ions, or electrons (depending upon the polarity of the voltage plate) are collected on the appropriate collecting strips, and a signal from the strips proportional to the x-ray flux above each strip is thereby produced and transmitted via contacts 40, 42 and collector plates 24, 26 to the exterior of the detector. Although a pair of voltage and collector plates is disclosed, a single voltage and collector plate combination could be used, and a number greater than 2 could also be used each parallel to each other. By changing the number of parallel plates, one can either increase or decrease the detector slice height or simultaneously measure slice thicknesses.

The tapered epoxy seal shown in FIG. 2 for fastening the collector plate into the detector provides a gastight seal betwen the collector and the end plate. The hole narrows toward the outside of the end plate. A ceramic plate and photolithographic pattern gold strips are inserted through the hole. The tapered slot is then filled with epoxy and allowed to harden in place. The taper shape causes some of the force of the epoxy (due to the xenon pressure inside the detector) to compress the epoxy rather than shearing it. Therefore, the collector plate is readily supported by a large contact area epoxy seal of the type shown.

Figure 5:
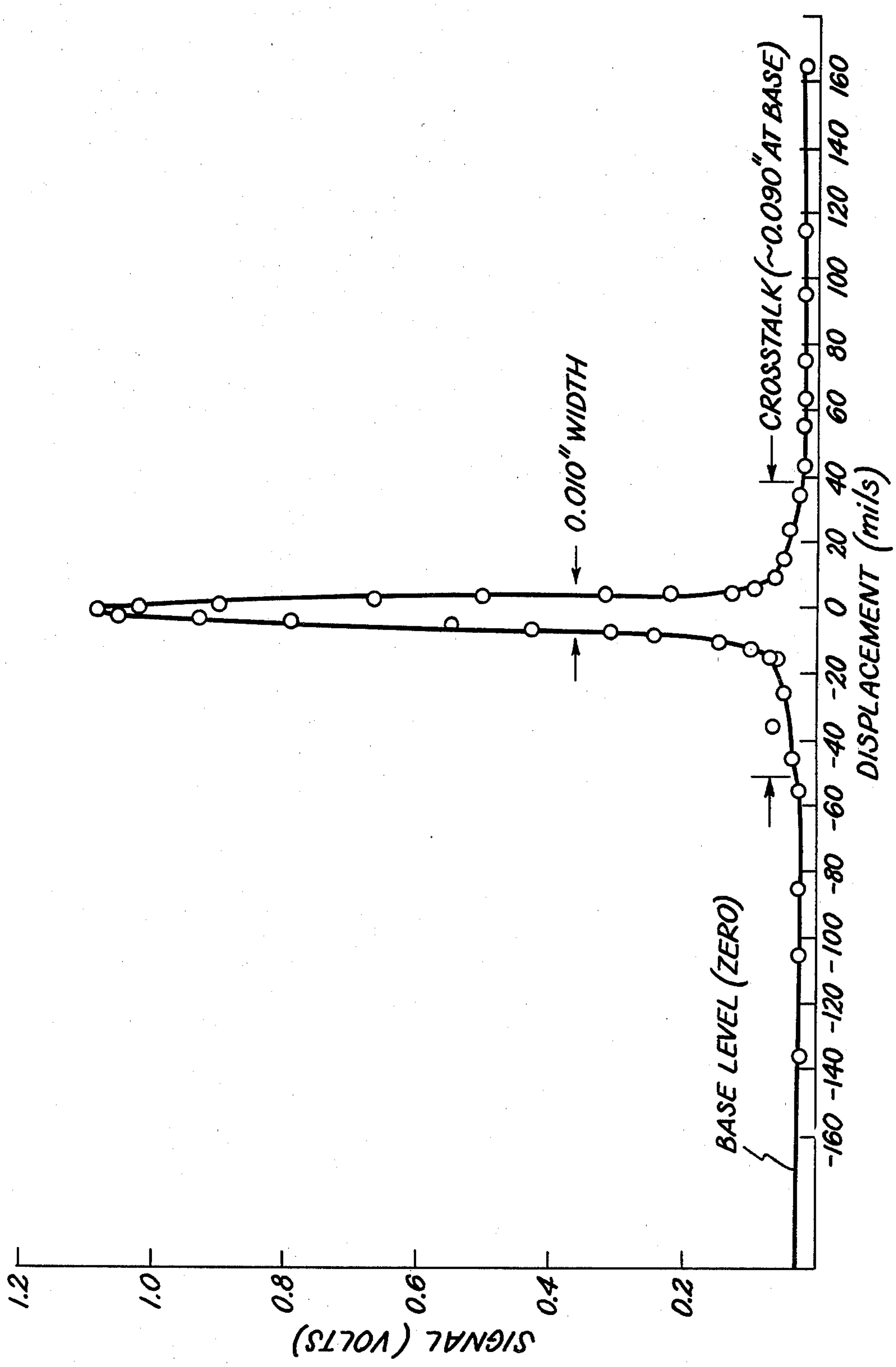
FIG. 5 is a typical response characteristic for a single strip of a detector array.

A test detector was assembled according to the instant invention. A plate ⅛" thick and 2" long of MACOR ceramic was inserted through the end plate of a detector housing and sealed as described above. The collector strips had a 5 mil center-to-center spacing and were 4 mils wide. The xenon was added to the detector to a pressure of 75 atmospheres. The response from one strip from the detector array as the whole detector is translated perpendicular to a 300 kev x-ray beam 4.8 mils wide and 31 mils high is shown in FIG. 5. A sharp voltage spike occurred at the point the detector was aligned with the x-ray beam. This sharp spike illustrates the resolution achievable with the instant invention. Each voltage and collector plate combination has a similar sharp detection characteristic providing high spatial resolution for an incident x-ray beam.

The instant invention provides a detector array which uses xenon pressure of 50 to 200 atmospheres so as to yield a xenon density of approximately 0.5 to 2.5 grams per cubic centimeter. The collector structure allows the production and use of multiple accurately positioned narrow strips of collector material which are brought out to a convenient external connection. As will be appreciated by those who are skilled in the art, the instant invention provides an apparatus for detecting high energy x-ray with high resolution.

We claim:

1. A high resolution detector array for computerized tomography comprising:
  a sealed housing forming a detection chamber having an x-ray permeable window therein;
  a collector plate extending through one wall of said housing into said chamber;
  a voltage plate disposed in said chamber parallel to said collector plate; and
  a volume of xenon gas disposed in said chamber at a density of approximately 0.5 to 2.5 grams per cubic centimeter.

2. The detector array of claim 1 wherein said collector plate comprises:
  a nonconductive substrate having a plurality of collector strips disposed thereon in parallel, closely spaced relationship perpendicular to said window.

3. The detector array of claim 2 further comprising:
  means for making electrical connection to said collector strips including means for impressing an electrical field between said collector plate and said voltage plate, and means for connecting each of said collector strips to a signal processing circuit.

4. The detector array of claim 3 wherein said means for making electrical connection to said collector strips comprises:
  a plurality of rectangular peninsulas extending from said collector plate outside said housing; each of said peninsulas having a plurality of collector strips extending thereto from inside said chamber to a plurality of spaced contact positions.

5. The detector array of claim 4 wherein:

said gaseous detecting medium has a pressure between approximately 50 and approximately 200 atmospheres.

6. The detector array of claim 5 further comprising:

a plurality of said collector plates and a plurality of said voltage plates disposed parallel to said first collector plate and voltage plate and extending through said end plate of said housing.

7. The detector array of claim 1 wherein said x-ray permeable window comprises a thin sheet of aluminum.

8. The detector array of claim 7 wherein said collector plate comprises a ceramic substrate having a plurality of collector strips disposed therein in closely spaced, parallel relationship to each other.

9. The detector array of claim 8 wherein each of said plurality of collector strips comprises a layer of chromium and a layer of gold deposited upon said substrate; and each of said strips has a width of approximately 4 mils and is separated from adjacent collector strips by a gap of approximately 1 mil.

* * * * *